Oct. 16, 1956  E. R. ORSATTI  2,767,304
SIGNAL LIGHT AND REFLECTOR
Filed Sept. 22, 1952
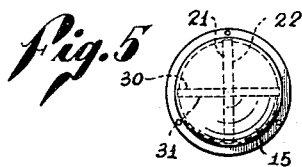
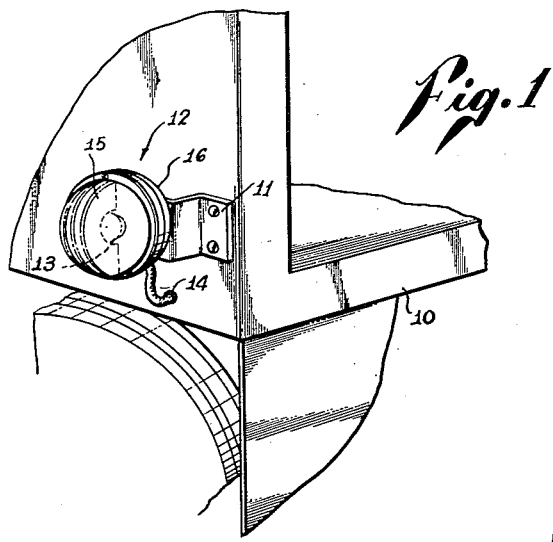
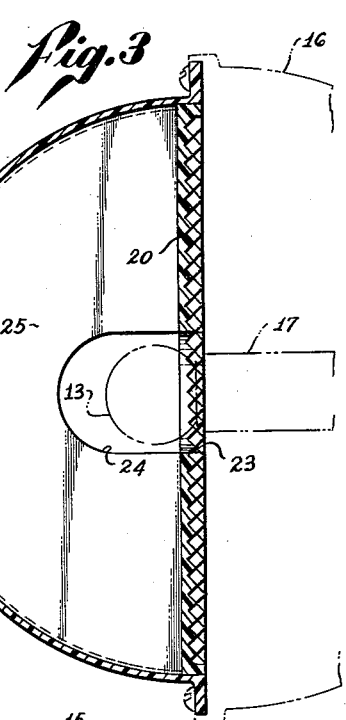
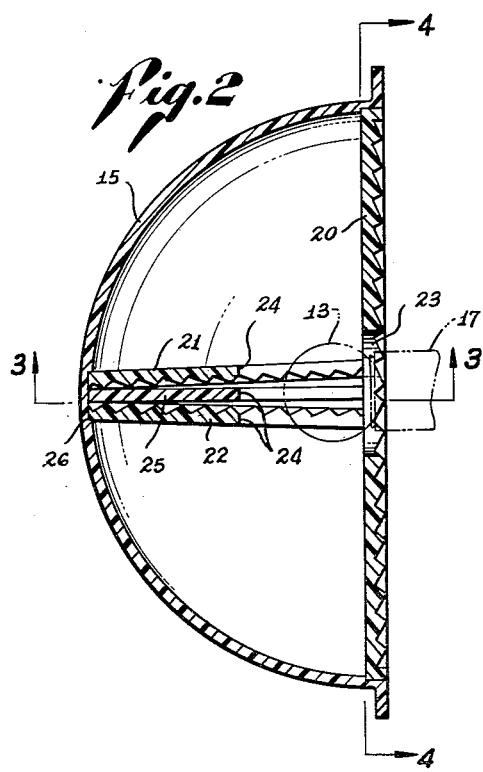
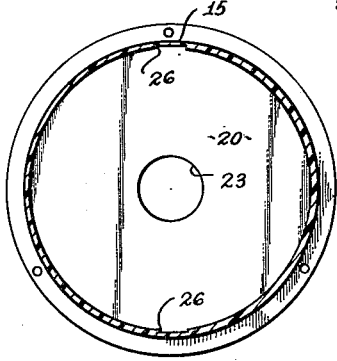
INVENTOR.
ERNEST R. ORSATTI
BY Fulwider & Mattingly
Attorneys

United States Patent Office 2,767,304
Patented Oct. 16, 1956

2,767,304

SIGNAL LIGHT AND REFLECTOR

Ernest R. Orsatti, Van Nuys, Calif., assignor of one-half to J. G. Moser

Application September 22, 1952, Serial No. 310,744

14 Claims. (Cl. 240—8.2)

My invention relates generally to visible signaling means, and more particularly to signaling means of the type that are generally self-illuminated, but which, when the normal source of illumination fails, act as reflectors to redirect light that may fall upon them. An example of such a signal light is found in the so-called "clearance lights" normally required to be installed upon the sides of trucks, buses, and other large vehicles.

Because of the size of trucks and similar vehicles, many states require that so-called clearance lights be installed upon the back and along the sides of the vehicle. These lights are usually required to be placed so that they mark the extreme outer boundaries of the vehicle, and consequently, the lights are subject to breakage, both by reason of vibration of the truck, and also by reason of hitting extraneous objects. Most frequently the filament of the lamp is the part that is broken, since it is quite fragile. The enclosing globe or housing is generally made of a relatively tough plastic, and it can withstand a greater degree of shock than can the filament. However, without the lighted filament, present day clearance lights are ineffective, even though the outer housing is intact.

Metallic reflectors are usually placed in the base of the clearance lights to direct the light from the lamp outwardly, but such reflectors are not effective when external light is directed from one side, instead of "head on." To achieve the maximum effectiveness, a reflector should be positioned within the lamp housing that will reflect external light whether it is directed from either side of the clearance light or head on.

It is therefore a major object of my invention to provide a signal or indicating light that is a very efficient device when operated in its normal manner with a lighted lamp therein, and is also effective to reflect light when the lamp within it is not operating.

Another object of my invention is to provide such a signal light that is effective to reflect incident light whether this light is directed substantially aligned with the optical axis of the signal light, or from one side thereof.

It is a further object of my invention to provide a signal light of this general character that can be manufactured to fit existing bases or mountings, thereby materially reducing the cost of maintenance and installation.

Still another object of my invention is to provide such a light that may be made of a tough material, such as some of the plastics, and in any desired color, as required by law or the wishes of the operator.

It is a still further object of my invention to provide a signal light having the above-mentioned features and advantages that can be inexpensively manufactured and sold, as well as produced in large quantities.

These and other objects and advantages of my invention will become apparent from the following description of a preferred form thereof, and from the drawings illustrating that form in which:

Figure 1 is a general perspective view of my improved signal lamp as it may be installed upon a truck;

Figure 2 is a horizontal cross-sectional view, to an enlarged scale, of the lamp shown in Figure 1;

Figure 3 is a vertical cross-sectional view taken on the line 3—3 of Figure 2;

Figure 4 is a sectional view of the lamp on a smaller scale, taken on the line 4—4 of Figure 2 and showing the shape of the reflector mounted in the base of the lamp; and Figure 5 is a view on a reduced scale of a modified form of my lamp, adapted to reflect light throughout a full 360° around an axis perpendicular to the base reflector, and to reflect light throughout an angle of more than 180° over the top of the dome.

Referring to the drawings and particularly Figure 1 thereof, the numeral 10 indicates generally a portion of the body of a truck, the particular portion shown being the rear lefthand corner. Mounted on the side of the body 10, as by a bracket 11, is a clearance light 12 having a light bulb 13 therein that is connected by a wire 14 to a source of power (not shown). A generally spherically shaped lens or transparent enclosure 15 houses the bulb 13, and usually the transparent housing is colored in accordance with various safety regulations. The portions of the lamp 12 that hold and support the transparent enclosure 15 and the light bulb 13 are standard and well known, and form no part of my present invention except as they may cooperate with other elements herein described. Briefly, these portions of the lamp 12 usually consist of a metal base or housing 16 having a centrally located socket 17 adapted to receive the light bulb 13, the base having a flanged outer surface adapted to receive and hold the transparent enclosure 15.

Within the enclosure 15 I mount a plurality of reflex reflecting members 20, 21, and 22, these preferably being of a refracting material such as glass, or some of the synthetic plastics, and having a series of prisms or projecting members on their rear or back surfaces so that light entering from the front surface is subject to total internal reflection. Members constructed in this manner and having these properties are well known in the art, as shown, for example, in the patent to Stimson No. 1,671,086, and in and of themselves, I make no claim to them as my invention except as they may be combined with other elements herein described. It will be appreciated that the reflecting members 20, 21, and 22 are normally formed of transparent material, preferably substantially colorless, but under certain conditions, it may be desirable to tint these members so that light reflected from them is colored.

As disclosed in the said Stimson Patent No. 1,671,086, light entering from the front or relatively smooth surface of the reflector may be caused to be reflected back. Some of the light from the bulb 13, however, even though it strikes the front surface of one of the reflecting members 20, 21, or 22, does not enter the body of the reflector and is not reflected from the rear surface thereof, as described, but instead is reflected from the front surface. Thus as a light beam is moved from a position where it is perpendicular to the front surface of such a reflector, to a position where it is almost parallel to that surface, light will pass into the body of the reflector until some particular angle is reached, termed the "critical angle," at which time the light is reflected from the front surface of the reflector, and substantially no light enters the body of the reflector for reflection from the rear surface thereof. Light from the bulb 13 striking the reflector 20 near its outer edge often makes an angle exceeding the critical angle, and this light is reflected from the front surface of the reflector.

The reflector 20, hereinafter referred to as the base reflector, is generally circular, disposed concentric with the bulb 13 and located in a plane substantially perpendicular to the axis of the complete lamp assembly 12, this axis passing through the bulb 13. One of the functions of this reflector is to reflect the light from the bulb 13 so that it is directed outwardly, away from the truck 10. In this way, light is directed outwardly, but instead of forming a concentrated beam, the light is somewhat diffused so that the combination including the bulb 13 and base reflector 20 is visible throughout a relatively wide angle on each side of the axis of the lamp. Preferably the base reflector 20 has a centrally located hole 23, as indicated in Figures 2 and 3, that is slightly larger than the maximum external diameter of the bulb 13, thus permitting the reflector to be removed from the housing 16 without disturbing or requiring the removal of the bulb.

While the base reflector 20 distributes light from the bulb 13 over a fairly wide angle, it will be appreciated that no material amount of light will be directed along a line substantially perpendicular to the axis of the lamp without other means being employed. In the case of trucks, etc., where the warning light is placed upon the side of the vehicle as indicated in Figure 1, it is important that some light be directed forwardly and rearwardly, in a direction generally parallel to the side of the truck, so that vehicles overtaking and passing the truck may have an indication as to the boundaries thereof. Under the circumstances, light from the bulb 13 must be directed perpendicularly to the axis of the lamp assembly 12, and to accomplish this, I make use of the reflecting members 21 and 22, hereinafter referred to as the perpendicular or auxiliary reflectors. These members are preferably formed of the same general material as the base reflector 20, all being of the so-called reflex type, and are generally semi-circular in shape to fit within the enclosure 15, extending to the base reflector 20. A central aperture 24, in the general form of a notch aligned with the aperture 23 in the base reflector 20, is formed in each of the reflecting members 21 and 22 to receive the bulb 13 of the incandescent lamp.

As indicated in Figure 2, the reflecting members 21 and 22 thus partially enclose the bulb 13 and light from the filament of that bulb impinges upon the rear surfaces of these perpendicular reflectors and is refracted and diffused to be projected in a direction generally perpendicular to the axis of the assembly, spreading over a fairly wide angle. By spacing the rear surfaces of the perpendicular reflectors 21 and 22 a slight distance apart, this lateral or perpendicular projection of light is increased, and by locating the perpendicular reflectors 21 and 22 so that they are spread apart a greater distance adjacent the base reflector 20, converging toward the axis of the assembly, even greater lateral distribution of light is obtained. The separation of the bases of the perpendicular reflectors 21 and 22 and the convergence of those reflectors toward the axis insures that a higher proportion of the total light from the globe 13 will strike the rear surfaces of those reflectors and will be refracted to project outwardly, forwardly and rearwardly from the lamp assembly 12. Additionally, as hereinafter described, a bright band of light is formed on the enclosure 15 by reason of the spacing.

To insure and maintain the proper separation between the perpendicular reflectors 21 and 22, I prefer to provide a spacing plate or rib 25 between the rear surfaces of the perpendicular reflectors. The plate 25 preferably is formed from a relatively smooth sheet of a transparent plastic, and like the perpendicular reflectors 21 and 22, is provided with a central aperture 24 to receive the bulb 13. To further aid in locating the perpendicular reflectors 21 and 22, a groove 26 is preferably formed in the interior of the enclosure 15, the groove thus holding the edges of the perpendicular reflectors 21 and 22 and the spacing plate 25 in firm and proper alignment.

By forming the spacing plate or rib 25 of a plastic having the necessary characteristics, the spacer transmits light from the bulb 13 to the enclosure 15 to produce a bright band of light (previously mentioned) on the enclosure. As a result a dark band is not formed on the exterior of the enclosure 15 such as might be caused by the presence of the perpendicular reflectors 21 and 22. This effect, while very desirable, is not essential to the construction or operation of my improved signal lamp.

The enclosure 15 is preferably formed of a colored, transparent plastic, and for convenience and simplicity in fabrication, the exterior and interior surfaces may be formed of concentric hemispheres so that no substantial refraction of light occurs. It will be appreciated, of course, that if desired, the enclosure 15 may be formed to provide a lens or refracting effect, using any desired type or shape of lens, including annular rings, ribs, or portions thereof. The reflecting members 20, 21, and 22 are preferably uncolored, and as a result, inventory and manufacturing problems can be greatly reduced.

From the foregoing, it will be appreciated that when the lamp assembly 12 is mounted on the side of a vehicle with the base reflector 20 in a vertical plane and with the perpendicular reflectors 21 and 22 in a substantially vertical plane, light from the bulb 13 will be directed outwardly, along the axis of the assembly, in a direction generally perpendicular to the base reflector 20, as well as forwardly and rearwardly, in a horizontal direction perpendicular to the perpendicular reflectors 21 and 22. The action of the base reflex reflector 20 in such an operation is substantially as previously described. Other light is reflected from the front surface of the reflector 20. In the case of the perpendicular reflex reflectors 21 and 22, light from the bulb 13 strikes the projections on the rear surfaces of these reflectors and is refracted and generally diffused to pass outwardly from the forward surfaces of those reflectors in a direction generally perpendicular thereto. In each case, the light from the bulb 13, which may normally be considered as white light, is reflected by the base reflector 20, and refracted by the perpendicular reflectors 21 and 22, none of which has the effect of coloring the light. However, when this light passes through the enclosing member 15, the latter, being tinted, colors the light.

If the incandescent lamp 13 is not operating, light falling upon the assembly 12 from a point generally aligned with the axis will pass through the enclosing member 15 and be colored thereby. Thereafter, this colored light falls upon the base reflector 20 and is redirected outwardly through the enclosing member, to render the lamp assembly visible to an observer substantially aligned with the light source. Since the light source will usually be the headlights of another vehicle, and since the driver is usually substantially aligned with those headlights, there is no difficulty whatsoever in detecting the presence of a vehicle having the warning lights thereon.

In the case of vehicles approaching the truck from the front or rear (perpendicularly to the axis of the lamp 12 mounted on the side of the truck), the light from the headlights of the approaching vehicle will fall upon one of the perpendicular reflectors 21 or 22, and be reflected thereby. As before, the light is colored by its passage through the enclosing member 15.

Though the reflecting members 20, 21, and 22 act very efficiently, a certain amount of light is transmitted through each of the members. Consequently, when the lights 12 are fixed to the side of the truck or vehicle, the headlights of an approaching vehicle shine upon the said warning lights 12, and the operator of another vehicle behind the truck will be able to see the warning lights very clearly by reason of the transmission of the headlights of the approaching vehicle through the perpendicular reflecting members 21 and 22. It will be appreciated, of course, that the projections on the rear surfaces of the perpendicular reflectors 21 and 22 act to diffuse and scatter light passing through them and consequently, the light that so passes through the complete assembly will be diffused rather than concentrated.

If light should fall upon the warning light 12 from a point intermediate the axis of the light assembly and a line perpendicular thereto, light will still be reflected back toward the source. It is a characteristic of reflex reflectors to reflect a light beam back in a direction substantially parallel to that of the incident ray, and this condition exists over a large angle of incidence, approaching 90°. Consequently, in most cases, light will be reflected from both the base reflector 20 and the perpendicular reflectors 21 and 22.

My improved warning and indicating light is not restricted to use on trucks, etc., of course. The light has many uses on relatively stationary objects, and can also be used with good effect on larger vehicles, such as boats, etc. For example, there are many places at airports and along airways where a reflecting light of this type is a great advantage. In the case of unattended emergency fields lights of this nature marking the runways are of great assistance in the event that a plane is forced to use such a field. By merely turning on the landing lights of the aircraft, the outline of the runway is clearly marked, and the pilot can land the plane in safety.

In certain instances, as in some airport and traffic installations, it is important to be able to reflect light from any position in azimuth and from any altitude. When this must be done the perpendicular reflectors 21 and 22 may be supplemented by additional perpendicular reflectors 30 and 31 as indicated in Figure 5. Under these conditions, the base reflector 20 will normally be horizontal as it will in most instances where the light is used as an airport or airway marker.

From the foregoing, it will be seen that I have provided a novel and efficient signal and indicating light suitable for use on trucks and similar vehicles, and many other applications, and fully capable of achieving the objects and securing the advantages heretofore set forth. While I have described a preferred form of my invention, I do not wish to be limited to the particular form or arrangement of parts herein described and shown, except as limited by my claims.

I claim:

1. An indicating and signal lamp assembly which includes: a light source; a reflector adjacent said light source and with said source defining an axis; a transparent housing enclosing said reflector and said light source; and an auxiliary reflex reflector within said housing having the property of transmitting through itself light first striking one of its surfaces, and of reflecting light first striking its opposite surface, said auxiliary reflector being located in a plane generally parallel and adjacent to said axis and generally perpendicular to said first-mentioned reflector, and extending substantially from said first-mentioned reflector to the intersection of said plane with said housing.

2. An indicating and signal lamp assembly which includes: a light source; a reflector adjacent said light source and with said source defining an axis; a transparent housing enclosing said reflector and said light source; and a pair of auxiliary reflex reflectors mounted back-to-back within said housing and each having the property of transmitting through itself light first striking its back surface, and of reflecting light first striking its front surface, said auxiliary reflectors being located in a plane generally parallel to said axis and on either side thereof, said auxiliary reflectors extending substantially from said first-mentioned reflector to the intersection of said plane with said housing.

3. An indicating and signal lamp assembly which includes: a light source; a base reflector adjacent said light source and with said source defining an axis; a transparent housing enclosing said reflector and said light source; and an auxiliary reflex reflector within said housing, located in a plane generally parallel to said axis and substantially aligned therewith, said auxiliary reflector extending substantially from said base reflector to the intersection of said plane with said housing and having an aperture therein adjacent said base reflector for receiving said light source.

4. An indicating and signal lamp assembly which includes: a light source; a base reflector adjacent said light source and with said source defining an axis; a transparent housing enclosing said reflector and said light source; and a pair of auxiliary reflex reflectors mounted back-to-back within said housing and each having the property of transmitting through itself light first striking its back surface, and of reflecting light first striking its front surface, said auxiliary reflectors being located in planes generally parallel to said axis and substantially aligned therewith, said auxiliary reflectors each extending substantially from said base reflector to the intersection of its plane with said housing and having an aperture therein adjacent said base reflector for receiving said light source.

5. A lens and reflector assembly for an indicating light which includes: a base reflector adapted to be positioned adjacent a source of light and defining therewith an axis; a transparent housing enclosing said reflector and adapted to receive said light source, said axis extending from said base reflector and through said housing; and an auxiliary reflex reflector within said housing located in a plane generally parallel to said axis and substantially aligned therewith, and extending substantially from said first-mentioned reflector to the intersection of said plane with said housing.

6. A lens and reflector assembly for an indicating light which includes: a base reflector adapted to be positioned adjacent a source of light and defining therewith an axis; a transparent housing enclosing said reflector and adapted to receive said light source, said axis extending from said base reflector and through said housing; and a pair of auxiliary reflex reflectors within said housing mounted back-to-back and each having the property of transmitting through itself light first striking its back surface, and of reflecting light first striking its front surface, said auxiliary reflectors being located in a plane generally parallel to said axis and on either side thereof, said auxiliary reflectors extending substantially from said first-mentioned reflector to the intersection of said plane with said housing.

7. A lens and reflector assembly for an indicating light which includes: a base reflector adapted to be positioned adjacent a source of light and defining therewith an axis; a transparent housing enclosing said reflector and adapted to receive said light source, said axis extending from said base reflector and through said housing; and an auxiliary reflex reflector within said housing located in a plane generally parallel to said axis and substantially aligned therewith, said auxiliary reflector extending substantially from said base reflector to the intersection of said plane with said housing and having an aperture adjacent said base reflector therein for receiving said light source.

8. A lens and reflector assembly for an indicating light which includes: a base reflector adapted to be positioned adjacent a source of light and defining an axis; a transparent housing enclosing said reflector and adapted to receive said light source, said axis extending from said base reflector and through said housing; and a pair of auxiliary reflex reflectors within said housing mounted back-to-back and each having the property of transmitting through itself light first striking its back surface, and of reflecting light first striking its front surface, said auxiliary reflectors being located in planes generally parallel to said axis and substantially aligned therewith, said auxiliary reflectors extending substantially from said base reflector to the intersection of their respective planes with said housing and having an aperture therein adjacent said base reflector for receiving said light source.

9. A lens and reflector assembly for an indicating light which includes: a base reflector adapted to be positioned adjacent a source of light and defining therewith an axis; a transparent housing enclosing said reflector and adapted to receive said light source, said axis extending from said base reflector and through said housing; and a pair of auxiliary reflex reflectors within said housing mounted back-to-back and extending substantially from said base reflector to the intersection of said axis with said housing, said auxiliary reflectors being located on opposite sides of said axis and being spaced apart adjacent said base reflector and converging toward the point where said axis passes through said housing.

10. A lens and reflector assembly for an indicating light which includes: a base reflector adapted to be positioned adjacent a source of light and defining therewith an axis; a transparent housing enclosing said reflector and adapted to receive said light source, said axis extending from said base reflector and through said housing; and a pair of auxiliary reflex reflectors within said housing mounted back-to-back and extending substantially from said base reflector to the intersection of said axis with said housing, each of said auxiliary reflectors being substantially plane and of the type having the property of transmitting through itself light first striking its back surface, and of reflecting light first striking its front surface, said auxiliary reflectors being located on opposite sides of said axis and being spaced apart adjacent said base reflector and converging toward the point where said axis passes through said housing, said auxiliary reflectors having an aperture therein for receiving said light source.

11. An indicating and signal lamp assembly which includes: a light source; a reflector adjacent said light source and with said source defining an axis; a transparent housing enclosing said reflector and said light source; and an auxiliary reflex reflector within said housing located in a plane generally parallel to said axis and substantially aligned therewith, and extending substantially from said first-mentioned reflector to the intersection of said plane with said housing, all of said reflectors cooperating to reflect external light striking said assembly in a direction parallel to said axis, perpendicular thereto and at an angle to said auxiliary reflector, or intermediate therebetween, and to direct light from said source in the same said directions.

12. An indicating and signal lamp assembly which includes: a light source; a reflector adjacent said light source and with said source defining an axis; a transparent housing enclosing said reflector and said light source; and a pair of auxiliary reflex reflectors within said housing mounted back-to-back in a plane generally parallel to said axis and on either side thereof, said auxiliary reflectors extending substantially from said first-mentioned reflector to the intersection of said plane with said housing, all of said reflectors cooperating to reflect external light striking said assembly in a direction parallel to said axis, perpendicular thereto and at an angle to said auxiliary reflectors, or intermediate therebetween, and to direct light from said source in the same said directions.

13. An indicating and signal lamp assembly which includes: a light source; a base reflector adjacent said light source and with said source defining an axis; a transparent housing enclosing said reflector and said light source; and a pair of auxiliary reflex reflectors within said housing mounted back-to-back and extending substantially from said base reflector to the intersection of said axis with said housing, said auxiliary reflectors being located on opposite sides of said axis and being spaced apart adjacent said base reflector and converging toward the point where said axis passes through said housing, all of said reflectors cooperating to reflect external light striking said assembly in a direction parallel to said axis, perpendicular thereto and at an angle to said auxiliary reflectors, or intermediate therebetween, and to direct light from said source in the same said directions.

14. An indicating and signal lamp assembly which includes: a light source; a base reflector adjacent said light source and with said source defining an axis; a transparent housing enclosing said reflector and said light source; and a pair of auxiliary reflex reflectors within said housing mounted back-to-back and extending substantially from said base reflector to the intersection of said axis with said housing, each of said reflectors being substantially plane and of the type having the property of transmitting through itself light first striking its back surface, and of reflecting light first striking its front surface, said auxiliary reflectors being located on opposite sides of said axis and being spaced apart adjacent said base reflector and converging toward the point where said axis passes through said housing, said auxiliary reflectors having an aperture therein for receiving said light source, all of said reflectors cooperating to reflect external light striking said assembly in a direction parallel to said axis, perpendicular thereto and at an angle to said auxiliary reflectors, or intermediate therebetween, and to direct light from said source in the same said directions.

References Cited in the file of this patent

UNITED STATES PATENTS

| | | |
|---|---|---|
| 1,950,548 | Fuller | Mar. 13, 1934 |
| 2,102,975 | Rolph | Dec. 21, 1937 |
| 2,176,546 | Robbins | Oct. 17, 1939 |